United States Patent [19]

Tomita et al.

[11] Patent Number: 5,796,711
[45] Date of Patent: Aug. 18, 1998

[54] OPTICAL DISC HAVING PLURAL ZONES OF RECORDING TRACKS

[75] Inventors: Yoshimi Tomita; Hideki Hayashi, both of Tsurugashima, Japan

[73] Assignee: Pioneer Electronic Corporation, Tokyo, Japan

[21] Appl. No.: 295,256

[22] Filed: Aug. 24, 1994

[30] Foreign Application Priority Data

Aug. 26, 1993 [JP] Japan ................. 5-211784
Dec. 1, 1993 [JP] Japan ................. 5-301861

[51] Int. Cl.$^6$ ............................. G11B 7/24
[52] U.S. Cl. ..................... 369/275.4; 369/275.3
[58] Field of Search ............... 369/275.4, 275.3, 369/13, 275.2, 277, 275.1, 32, 48, 111, 54, 124, 278, 44.26; 360/48

[56] References Cited

U.S. PATENT DOCUMENTS

| | | |
|---|---|---|
| 4,329,575 | 5/1982 | Roach ................. 369/275.3 X |
| 4,341,952 | 7/1982 | John et al. ................. 369/275.3 X |
| 5,255,261 | 10/1993 | Iida et al. ................. 369/275.3 |
| 5,345,435 | 9/1994 | Yamasaki ................. 399/275.3 |
| 5,377,178 | 12/1994 | Saito et al. ................. 369/124 |
| 5,418,773 | 5/1995 | Bakx et al. ................. 369/275.1 |
| 5,446,724 | 8/1995 | Tabe et al. ................. 369/275.1 |

Primary Examiner—Ali Neyzari
Attorney, Agent, or Firm—Sughrue, Mion, Zinn, Macpeak & Seas, PLLC

[57] ABSTRACT

An optical disc of a sampled servo tracking method excludes unnecessary interference to wobbled pits of the servo area, whereby a tracking servo can be stably performed, a high density maintained, and a large recording capacity obtained. An optical disc in which a circular recording area comprising a plurality of concentric tracks or a spiral recording track which hold information signals including sync signals is divided into a plurality of zones bounded by circular boundary areas. The recording track is constituted by a plurality of sectors each comprising servo areas and data areas, the servo areas being located along straight lines in radial directions within the zone. The track pitch of the boundary area is made larger than the track pitch within the zone.

7 Claims, 12 Drawing Sheets

OPTICAL DISC HAVING PLURAL ZONES OF RECORDING TRACKS

BACKGROUND OF THE INVENTION

1. Field of the Invention

The present invention relates to an optical disc and a recording method for recording and, more particularly, to an optical disc according to the MCAV or MCLV system in which an information signal including a sync signal is recorded along a concentric tracks or a spiral recording track, and also to a method for recording an information signal on an optical disc to form such a recording area.

2. Description of Background Information

As recording formats for recording and reproducing data to/from an optical disc medium, the CAV (Constant Angular Velocity) system, CLV (Constant Linear Velocity) system, MCAV (Modified CAV) system, and MCLV (Modified CLV) system are known in the art. The MCAV and MCLV systems are devised by improving the CAV and CLV systems so as to raise the efficiency of utilization of the disc surface area.

However, it is desirable that a recording density of such an optical disc be increased further as compared with the systems described above.

OBJECTS AND SUMMARY OF THE INVENTION

An object of the present invention is therefore to provide an optical disc and a recording method in which the density of recording is substantially raised as compared with conventional discs.

Another object of the invention is to provide an optical disc in which the generation of unnecessary interference to a wobbled pit of a servo area is prevented by enlarging a track pitch in a boundary area between zones on an optical disc of the MCAV or MCLV system using a sampled servo tracking method, so that a tracking servo operation can be stably executed.

A further object of the invention is to provide a recording method whereby a frequency characteristic of an optical head feed driving system of a mother disc recording apparatus which forms a servo area is broadened to a wide band area and, in the formation of a boundary area, a feed velocity of an optical head of an optical cutting apparatus is raised for a predetermined period of time, whereby a track pitch is increased when the information is recorded.

According to the present invention, there is provided an optical disc in which a circular recording area comprising a plurality of concentric tracks or a spiral recording track which hold information signals including sync signals is divided into a plurality of zones by circular boundary areas, wherein the optical disc is characterized in that the recording track is constituted by a plurality of sectors each comprising a servo area and a data area, the servo areas are located on the same straight line of the radial direction in each of the zones and the track pitch of the boundary area is determined to be larger than the track pitch in the zone.

According to the present invention, there is provided a recording method of an optical disc for producing a circular recording area which is constituted by spiral recording tracks having an information signal including a sync signal, wherein the method is characterized in that the recording area is formed by alternately forming a zone in which a light beam spot corresponding to the information signal is moved in the radial direction at a first feed velocity, thereby recording the information signal while keeping an optical disc mother disc at a constant rotational angular velocity corresponding to a predetermined radial position range, and a circular boundary area which is consecutively formed after the zone and in which the light beam spot is moved in the radial direction at a second feed velocity higher than the first feed velocity, thereby recording the information signal.

In the optical disc recording method according to the invention, the optical disc mother disc is divided into a plurality of zones in the radial direction and the recording is performed, wherein the servo areas are aligned in the radial direction in the zone, the servo areas are not aligned in the radial direction in the boundary area, and the recording is performed at a track pitch wider than that in the zone.

According to the invention, a high density due to the reduction of the track pitch in the zone is achieved, so that a recording capacity higher than that of the conventional optical disc is obtained.

DETAILED DESCRIPTION OF THE PREFERRED EMBODIMENTS

A conventional recording method will be described with reference to FIGS. 1 to 7 prior to explaining embodiments of the invention.

Figure 1:
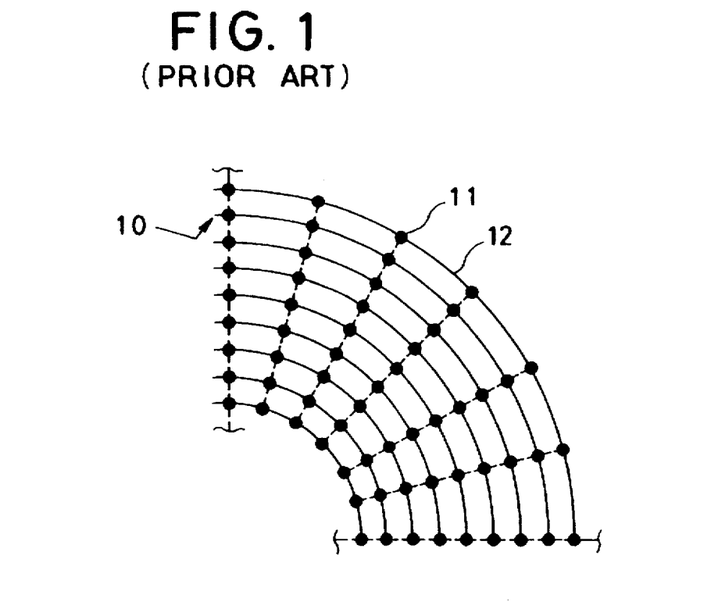
FIG. 1 is a schematic plan view showing a format of an optical disc of the CAV system.
Figure 2A:
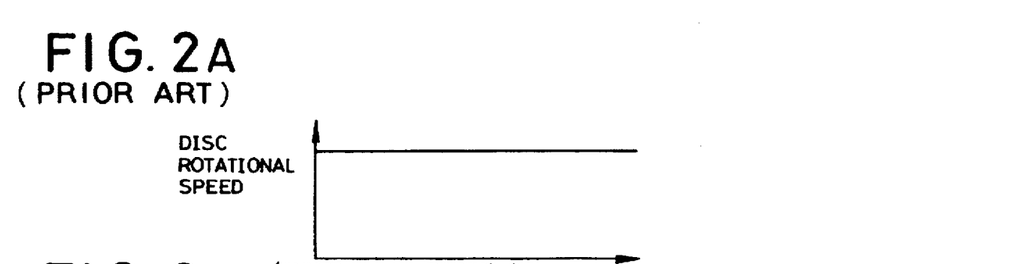
FIGS. 2A–2C show graphs indicating changes in disc rotational speed, data rate, and recording pit length for the position in the disc radial direction of the CAV system optical disc.
Figures 2B, 2C:
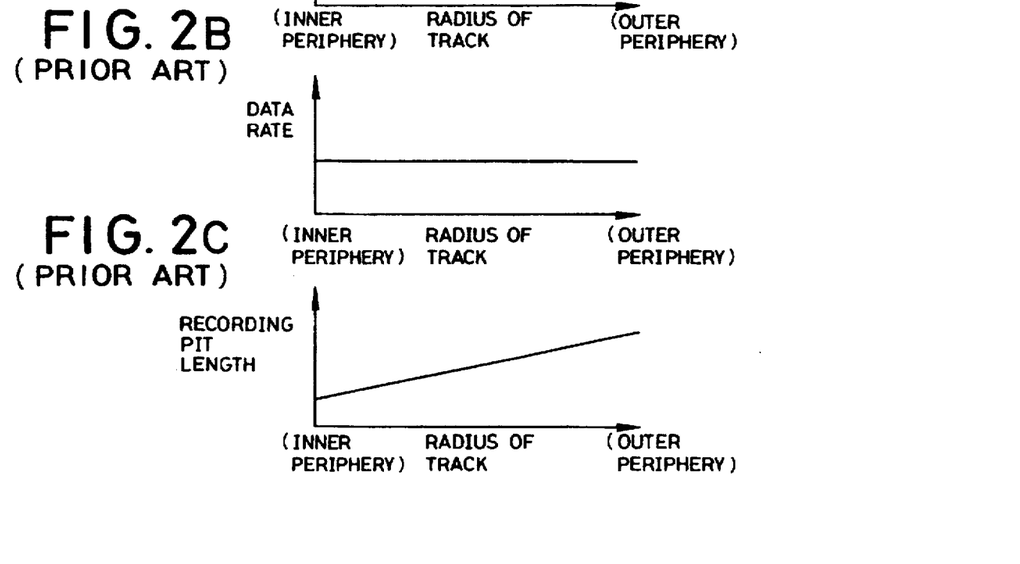

According to the format of the CAV system optical disc, as shown in FIG. 1, address areas 11 and data areas 12 which are recorded along a track 10 are aligned in the radial direction (broken lines) of an optical disc 1 and are radially arranged. Since the optical disc rotational speed and the data rate are constant at all radical circumferences as shown in portions 2A and 2B in FIG. 2, the recording pit length increases as the position approaches the outer periphery, thereby causing the recording density to be lowered.

Figure 3:
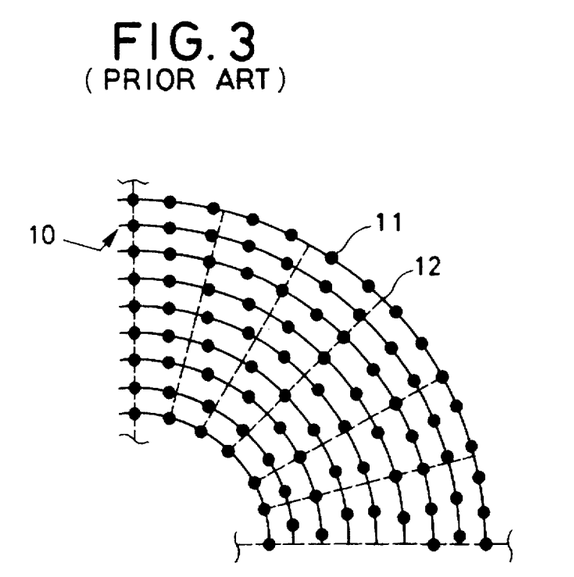
FIG. 3 is a schematic plan view showing a format of an optical disc of the CLV system.
Figure 4A:
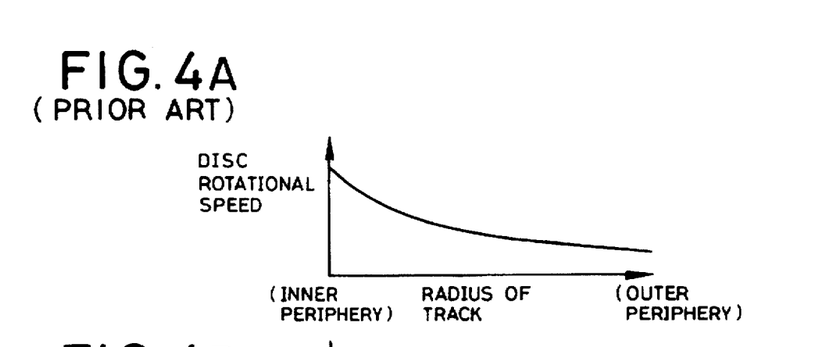
FIGS. 4A–4C are diagrams indicating changes in disc rotational speed, data rate, and recording pit length for the position in the disc radial direction of the CLV system optical disc.
Figure 4B:
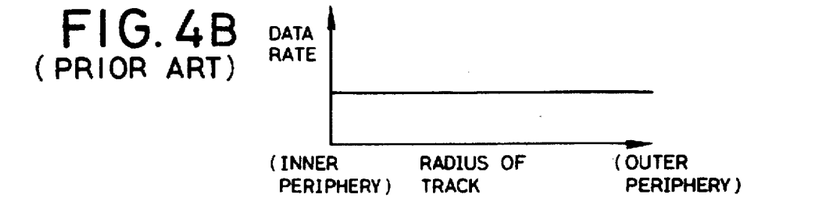
Figure 4C:
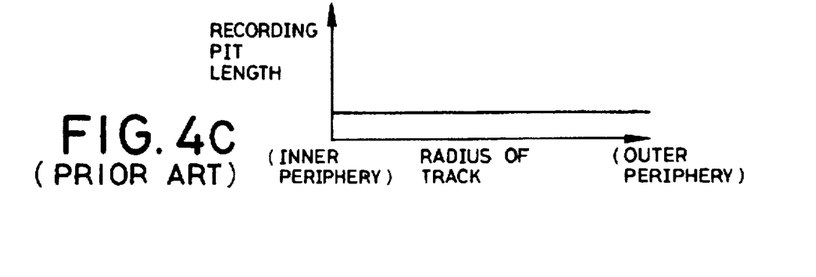

According to the format of the CLV system optical disc, as shown in FIG. 3, the address areas 11 and the data areas 12 are arranged without being aligned in the radial direction. In order to cause the linear velocity to be constant in each track, as shown in the portions 4A and 4B in FIG. 4, the rotational speed of the optical disc is reduced in inverse proportion to the radial position to be recorded, whereby the data rate is maintained constant. Due to the above-described control of the rotational speed, the recording pit length is constant at all radical circumferences as shown in the portion 4C in FIG. 4. Therefore, a recording capacity of the CLV system optical disc is larger than that of the CAV system optical disc.

Figure 5:
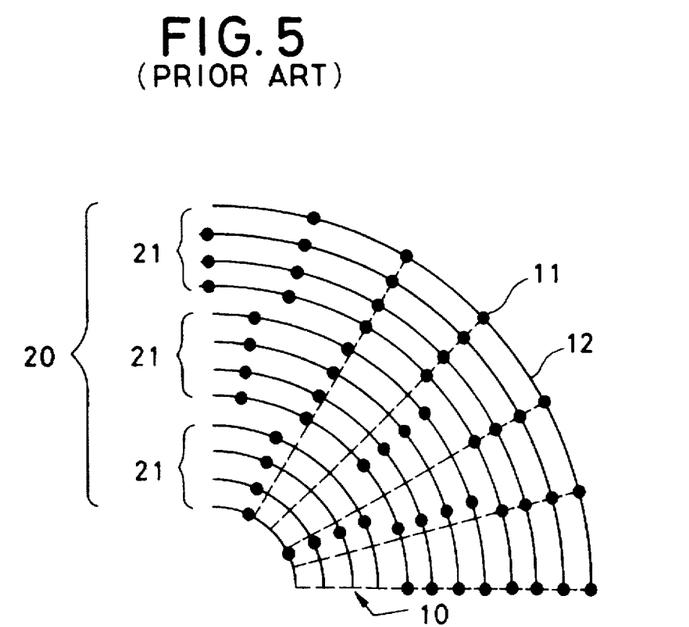
FIG. 5 is a schematic plan view showing a format of an optical disc of the MCAV and MCLV systems.

In the MCAV and MCLV systems which are obtained by improving the CAV and CLV systems, as shown in FIG. 5, an annular recording area 20 of the optical disc is divided into a plurality of zones 21. In each zone, the recording pits are recorded so that a recording pit length increases as the position approaches the outer periphery. In both systems, the address areas 11 and data areas 12 are aligned in the radial direction within each zone.

Figure 6A:
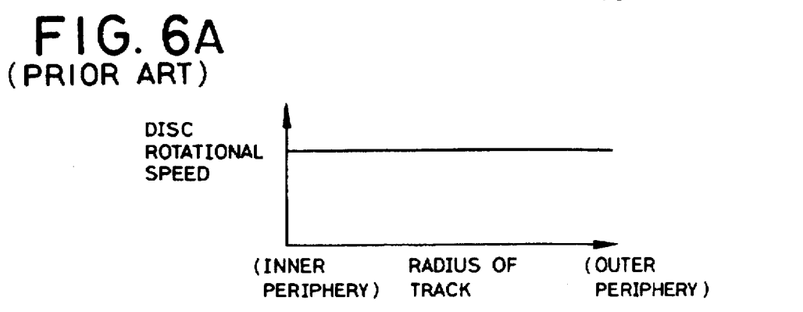
FIGS. 6A–6C are diagrams indicating changes in disc rotational speed, data rate, and recording pit length for the position in the disc radial direction of an optical disc of the MCAV system.
Figure 6B:
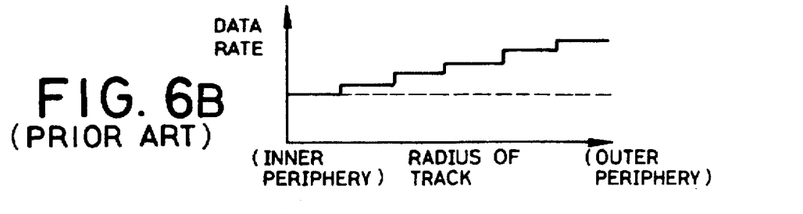
Figure 6C:
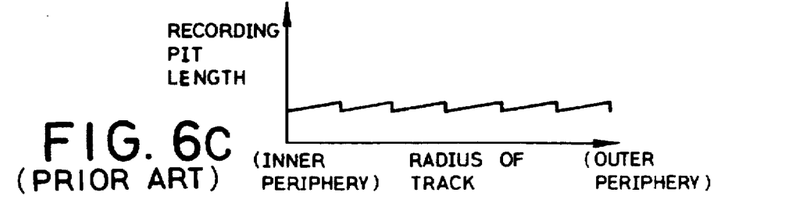
Figure 7A:
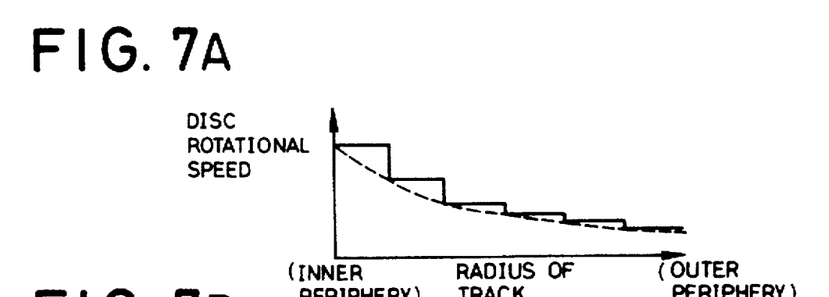
FIGS. 7A–7C are diagrams indicating changes in disc rotational speed, data rate, and recording pit length for the position in the disc radial direction of an optical disc of the MCLV system.
Figure 7B:
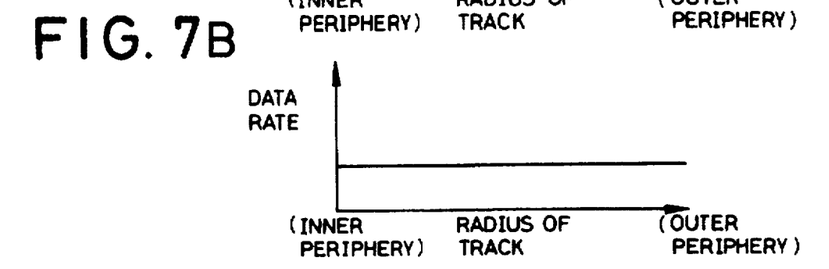
Figure 7C:
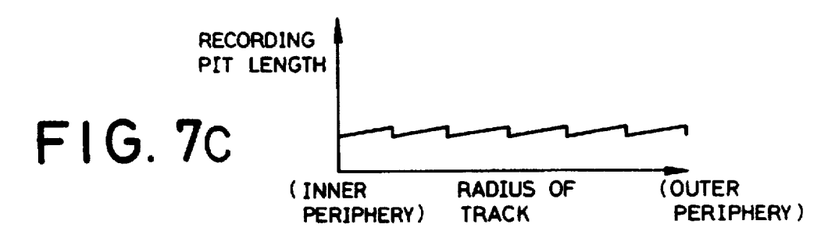

In the MCAV system, as shown in the portion 6A in FIG. 6, the optical disc rotational speed is maintained constant. The data rate of the zone is increased step by step so as to be larger than that of the CAV system as the position approaches the outer periphery, as depicted in the portion 6B of FIG. 6. Due to this operation, the recording pit length in each zone is made shorter than that in case of the CAV system and can be maintained within a generally constant range, as depicted in the portion 6C in FIG. 6. On the other hand, in the MCLV system, as shown in the portion 7A in FIG. 7, an optical disc rotational speed which is constant within every zone is reduced step by step as the position approaches the outer periphery, whereby the data rate is maintained to be constant at all radial circumferences, as depicted in the portion 7B of FIG. 7. The recording pit length is made shorter than that in the case of the CAV system and is maintained almost constant, as depicted in the portion 7C in FIG. 7. Therefore, in both of the modified systems, a recording capacity of the optical disc is larger than that of the CAV system. In the MCAV and MCLV systems, the efficiency in utilization of the optical disc surface area is increased as compared with the CAV and CLV systems.

An embodiment of the invention will now be described with reference to the drawings.

Figure 8:
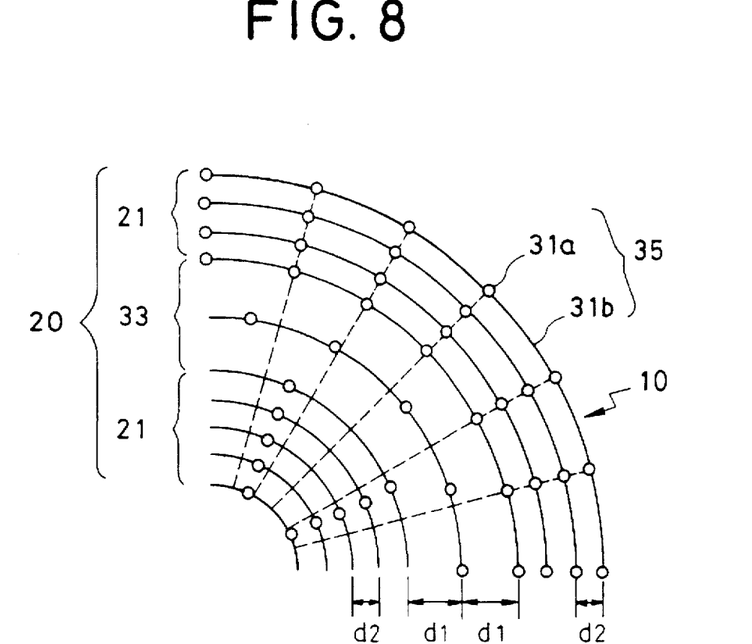
FIG. 8 is a schematic plan view showing a format of the optical disc of the invention.

As shown in FIG. 8, the optical disc of the embodiment has a structure in which the circumferential recording area 20 comprising the a spiral recording track (or a plurality of concentric recording tracks) 10 having an information signal including a sync signal is divided into a plurality of zones 21 by an annular boundary area 33. The recording track 10 of the sampled servo tracking system comprises a plurality of sectors 35 each of which is constituted by servo areas 31a and data areas 31b. Within each zone 21, the servo areas 31a are recorded so as to be positioned on the same straight line in the radial direction as corresponding servo areas 81a or other track.

In the present invention, the signal is recorded so that a track pitch d1 of the boundary area 33 is larger than a track pitch d2 in the zones 21. Although FIG. 8 shows the case where the boundary area 33 is constituted by only one track, a plurality of tracks 10 can be also formed in the boundary area 33 as shown in FIG. 9.

A track pitch of the spiral recording track of the boundary area 33 is gradually enlarged and gradually reduced from the outermost track of the zone on the inner periphery side to the innermost track of the zone on the outer periphery side. On the other hand, in the case of a disc comprising a plurality of concentric recording tracks, it is possible to provide only the enlarged track pitch d1 without providing a recording track between the outermost track of the zone on the inner periphery side and the innermost track of the zone on the outer periphery side.

In case of recording from the inner periphery of the optical disc mother disc, the recording pit length of the boundary area 33 is gradually reduced from the outside recording pit length in the zone on the inner periphery side of the boundary area to the inside recording pit length in the zone on the outer periphery side.

Figure 9:
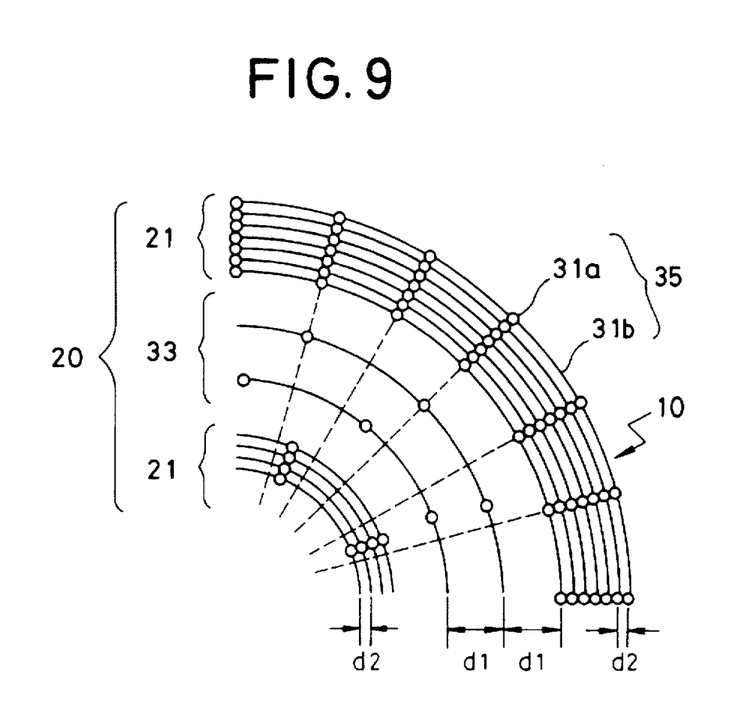
FIG. 9 is a schematic plan view showing a format of an optical disc of another embodiment.

By increasing the track pitch d1 in the boundary area 33 shown in FIGS. 8 and 9, an interference from the neighboring track can be reduced. Due to this scheme, in case of the sampled servo tracking method, even if a pair of wobbled pits of the servo area 31a are shifted in the track direction and are not aligned in the radial direction (for example, the narrow track pitch recording and reproducing method which will be explained later), there is no interference which is unnecessary to the wobbled pits and a tracking servo can be stably performed.

Figure 10:
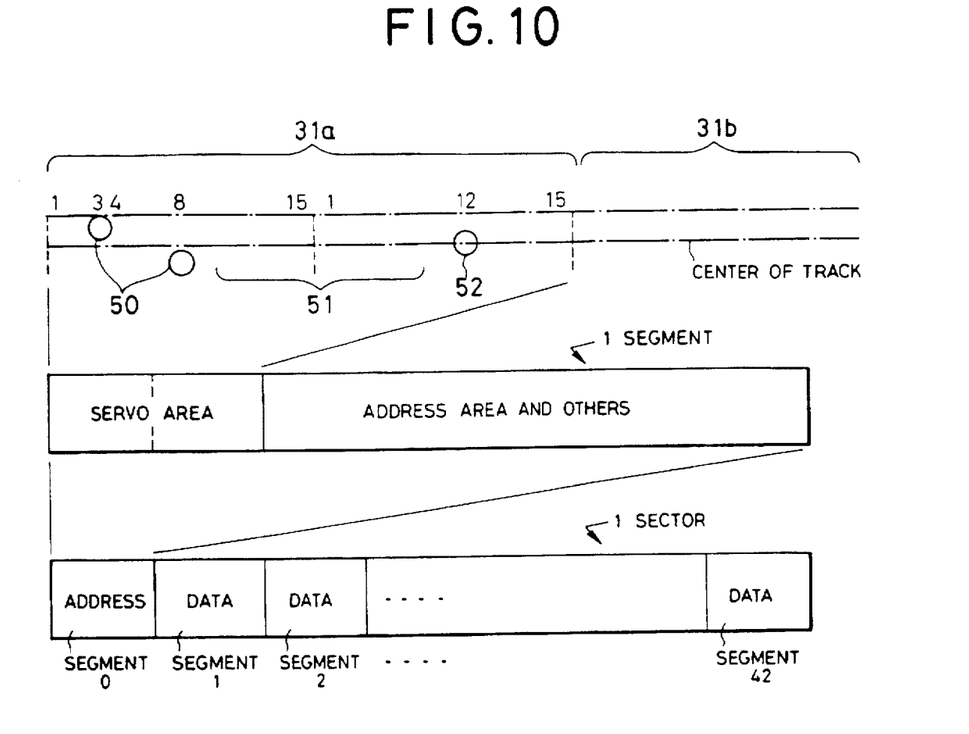
FIG. 10 is a schematic diagram showing a format of an optical disc of the sampled servo tracking method.

As shown in FIG. 10, in general, the servo area 31a of the sampled servo tracking method is previously recorded by the mother disc recording apparatus separately from the data area 31b. Namely, the sampled servo tracking method is a method whereby a deviation of a pair of wobbled pits 50 which are deviated and arranged so as to sandwich the center of the track with a predetermined distance in the track direction is detected, thereby forming a tracking error signal. As a sector format, for example, 43 segments, each comprising 18 bytes, are arranged to thereby form one sector. Each segment has the servo area 31a in which the wobbled pits 50 at the head position and subsequently a mirror surface portion 51 and a clock pit 52 have been preformatted. The wobbled pits 50 are used for the tracking servo, the mirror surface portion 51 is used for the focusing servo, and the clock pit 52 is used for the PLL.

Figure 11:
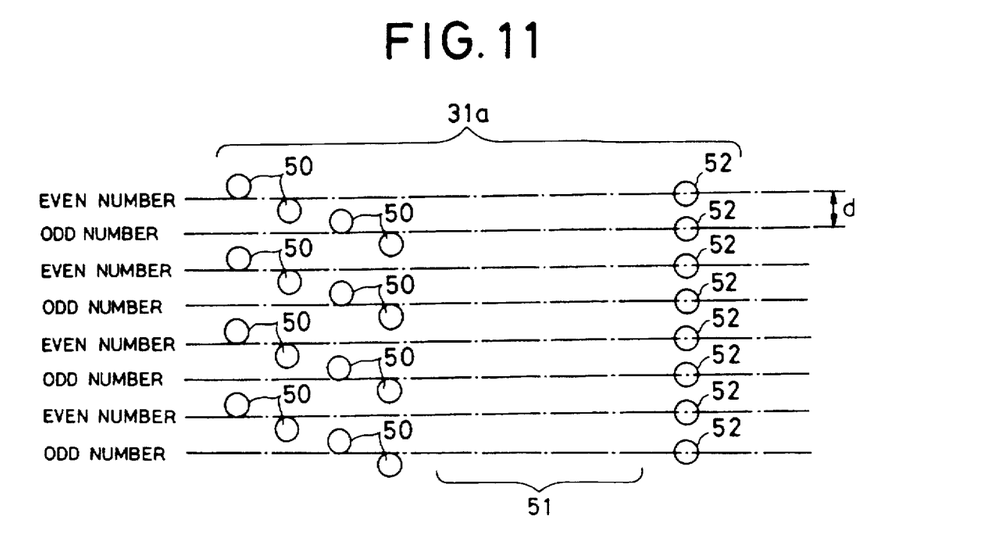
FIG. 11 is a schematic enlarged plan view showing a format of the optical disc of the embodiment.

In the optical disc of the sampled servo tracking method, a narrow track pitch recording and reproducing method (hereinbelow, referred to as a narrow tracking method) whereby the recording is performed by narrowing the track pitch in order to raise a recording density has been proposed. A track density of the optical disc mother disc is raised and a recording capacity can be increased. According to the narrow tracking method, for example, as shown in FIG. 11, the position of the pair of wobbled pits 50 in the tracking direction is shifted between the odd number track and the even number track. The pair of wobbled pits in both of the odd number and even number tracks are formed so that the neighboring portion is the unrecorded mirror surface portion 51, whereby unnecessary interference to the wobbled pits is avoided even if the track pitch is narrowed. In case of the narrow track method, since the CAV system in which the servo areas 31a are aligned in the radial direction on the whole surface of the optical disc mother disc needs to be used, there is a limitation in the enlargement of a recording capacity. On the other hand, it is considered that the narrow track method cannot be used together with the recording format in which servo areas are not aligned in the boundary area.

Figure 12:
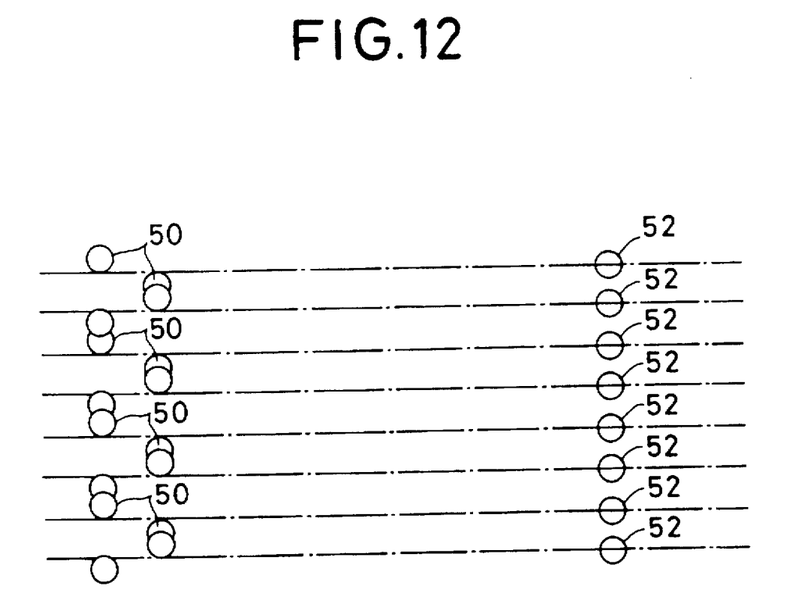
FIG. 12 is a schematic enlarged plan view showing a format of the optical disc of another embodiment.

According to the invention, however, in the MCAV or MCLV system as mentioned above, by increasing the track pitch in the boundary area, even if the servo areas are not aligned, there is no unnecessary interference to the neighboring wobbled pits, and the tracking servo can be stably performed. The pair of wobbled pits 50 is not limited to the case where they are arranged so as to be deviated in the track direction. As shown in FIG. 12, it is also possible to record twice the wobbled pits 50 of the neighboring tracks so as to be partially overlapped.

Figure 13:
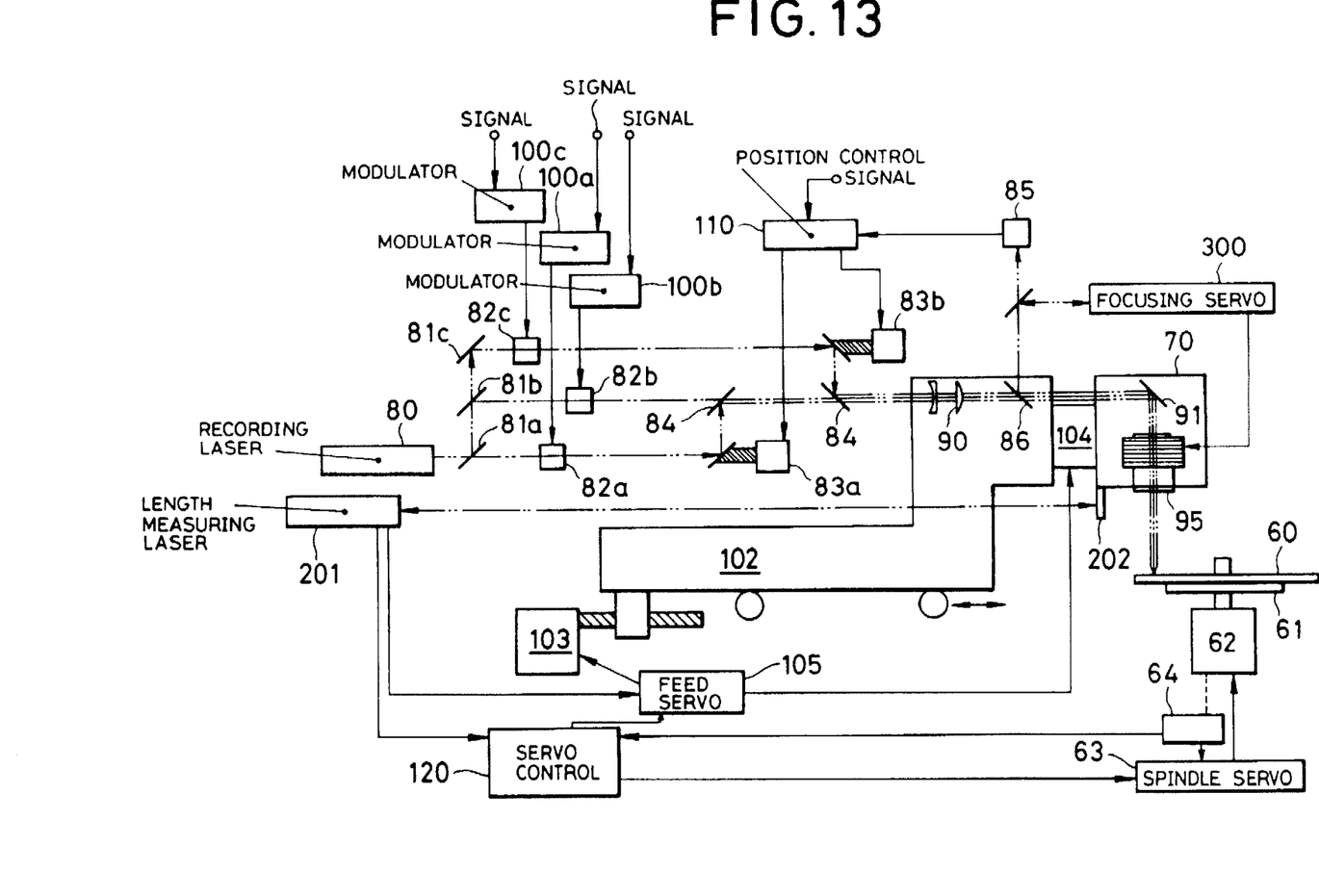
FIG. 13 is a schematic block diagram of an optical disc mother disc recording apparatus of the embodiment.

Specifically, although the recording of the preformatted portion, namely, the servo area of the optical disc mother disc of the embodiment, is not limited to the above example, it is recorded by, for example, a mother disc recording apparatus of the three-beam system as shown in FIG. 13.

An optical disc mother disc 60 on which a photosensitive material such as photo resist or the like has been painted is first put on a turntable 61. The turntable 61 is rotated by a spindle motor 62. The rotation of the spindle motor 62 is controlled by a spindle servo circuit 63.

The rotation of the optical disc mother disc 60 is detected by a rotary encoder 64 from the spindle motor 62 and a rotation signal thereof is supplied to the spindle servo circuit 63. The spindle servo circuit 63 forms a rotation control signal by comparing the frequencies and phases of a reference signal supplied from a servo control circuit 120 and the rotation signal, thereby controlling the rotation of the spindle motor 62. The rotary encoder 64 also supplies the rotation signal indicative of the rotation of the spindle motor 62 to the servo control circuit 120.

Further, in the three-beam generating means, a light beam emitted from a laser 80 for recording enters a beam splitter 81a and is divided into a reflection light and a transmission light. The transmission light beam goes to a movable mirror 83a through an AO (accost-optic) modulator 82a. The reflected light beam is directed to a beam splitter 81b. The light beam incident into the beam splitter 81b is divided into a reflection light and a transmission light. The transmission light beam enters a fixed mirror 81c and the reflected light beam enters a fixed half mirror 84 through an AO modulator 82b and is transmitted. The light beam reflected by the fixed mirror 81c is directed to a movable mirror 83b through an AC modulator 82c.

Predetermined signals for wobbled pits are supplied from modulators 100a and 100c to the AO modulators 82a and 82c and a predetermined signal for a clock pit is supplied from a modulator 100b to the AO modulator 82b, respectively. The light beams, therefore, are converted into transmitting/non-transmitting states according to the predetermined signals by the corresponding AO modulators and sequentially become the light beams for the wobbled pit, clock pit, and wobbled pit, respectively, in the order from the upper side of the diagram.

Since the movable mirrors 83a and 83b are moved in parallel with the optical axis of the light beam for clock pit in accordance with a signal from a position control circuit 110, the movable mirrors 83a and 83b and the fixed half mirror 84 cooperatively cause the two light beams for wobbled pits on both sides to be adjacent to the light beam for the clock pit and almost in parallel thereto, in a manner that the distances among those light beams are variable. Beam radii of the almost parallel three light beams are enlarged by a light beam expander 90 and the resultant light beams pass through a deflecting mirror 91 and an objective lens 95 in the optical head 70 and are irradiated to the photo resist layer on the rotating optical disc mother disc 60.

The irradiated three light beams are reflected by the photo resist layer on the optical disc mother disc 60 and the reflected lights are supplied via the optical head 70 to a position detecting apparatus 85 including an image pickup device such as a CCD camera or the like through the beam splitter 86. The relative irradiating positions of the light beams for clock pit and wobbled pits are detected by the position detecting apparatus 85 and position signals are supplied to the position control circuit 110. That is, the relative positions of the three beams are detected by detecting the number of horizontal scanning lines existing between spots of the return light beams on the image pickup surface. In order to set the distance between the light beam for wobbled pits and the light beam at the center for clock pits, for example, to be a ¼ track pitch in accordance with the position signal, the position signal is compared in the position control circuit 110 with a reference value indicative of the correct relative irradiating position. The resultant error signal is supplied as an irradiation control signal to a movable mirror driving circuit. As mentioned above, the initial setting is performed at the time of recording. The movable mirror driving circuit drives the movable mirrors 83a and 83b in parallel in accordance with the irradiation control signal and controls the relative irradiating position of the light beam. As a result, the spot of the light beam for wobbled pits is deviated in the radial direction of the optical disc mother disc.

In order to form tracks on the optical disc mother disc 60 at a variable pitch, the objective lens 95 of the optical head 70 is movably supported in the radial direction of the optical disc mother disc 60 by a head feed driving system of a wide band. The head feed driving system comprises: a carriage 102 for supporting the optical head 70; a carriage motor 103 which is fitted to the carriage and rotates a screw that is expanded in the radial direction of the optical disc mother disc 60, thereby coarsely adjusting the movement of the optical head 70; an actuator 104 for finely adjusting it; and a feed servo circuit 105 for controlling the driving and the rotation. Wide band characteristics of the optical head feed driving system are accomplished by driving the actuator 104, which is, for example, a biaxial actuator constructed of a parallel plate spring disclosed in Japanese Patent Kokai No. H3-150740, and further by the rotation of the carriage motor, and the feed servo control for these components.

The mother disc recording apparatus also has a focusing servo system 300. That is, the laser light beam is joined to the recording light beam by a component of the optical system such as a reflecting mirror or the like. After that, the resultant light beam is irradiated onto the optical disc mother disc 60, the reflected light from the mother disc is transmitted through the objective lens and is led to an astigmatism optical system and to a four-split photodetector by an optical system component such as a reflecting mirror or the like. In accordance with a focusing error signal from the detector, the position of an actuator coil of the objective lens 95 is adjusted in the vertical direction for the main surface of the optical disc mother disc 60. In this manner, the focusing servo is performed.

In order to measure the position of the movable objective lens 95 in the radial direction of the optical disc mother disc, a fixed laser length measuring device 201 which operates together with a plane mirror 202 attached to the optical head casing is used. Distance information from the reference position of the optical head 70 which is necessary for the feed servo control is obtained. The laser length measuring device 201 measures the position and velocity of the plane mirror 202 at a high resolution by a pulse reflection light beam from the plane mirror 202 and supplies a head position signal to the feed servo circuit 105 and the servo control circuit 120.

The head position signal is fed back to the carriage motor 103 and the actuator 104. That is, only the low frequency component of the head position signal is fed back to the carriage motor 103, for performing a coarse adjustment through an equalizer and a motor driver by a low pass filter. The head position signal is fed back as it is to the actuator 104 mainly for performing a fine adjustment via the equalizer and the actuator driver. Due to this, the characteristics of the wide band of the optical head feed driving system are accomplished. As mentioned above, the rotation of the carriage motor 103 is controlled by an output of the feed servo circuit 105, thereby controlling the movement in the radial direction of the optical head for the laser for recording.

The head position signal from the laser length measuring device 201 and the rotation signal from the encoder 64 are supplied to the servo control circuit 120. The feed servo circuit 105 and the spindle servo circuit 63 are controlled so as to form the tracks at a correct pitch in accordance with the rotation of the optical disc mother disc 60.

In this instance, the servo control circuit 120 has a frequency dividing circuit and a linear velocity detecting circuit. A frequency dividing ratio in the frequency dividing circuit is sequentially changed by an output corresponding to the linear velocity calculated by the linear velocity detecting circuit by using outputs from the laser length measuring device and the encoder.

That is, a recording linear velocity v is calculated with the relation of (v=rω) in the servo control circuit on the basis of a rotational angular velocity (ω) detected by the rotary encoder 64 and a distance r from the rotational center of the optical disc mother disc 60 to an information detecting point which is detected by the laser length measuring device 201. The frequency dividing ratio is changed step by step so that the linear velocity v lies within a predetermined range.

Figure 14A:
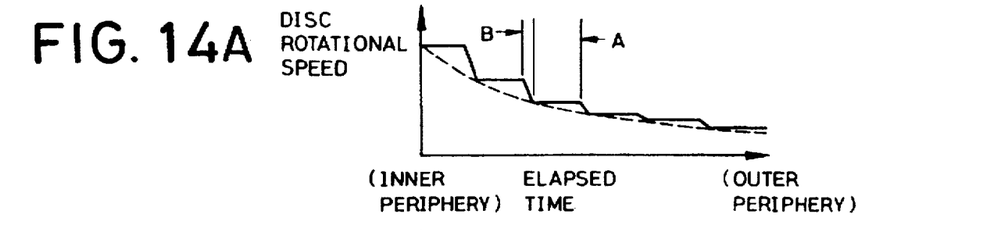
FIGS. 14–14E are diagrams indicating changes in disc rotational speed, data rate, recording pit length, track radius, and head feed velocity for the recording elapsed time of the optical disc of the embodiment.
Figure 14B:
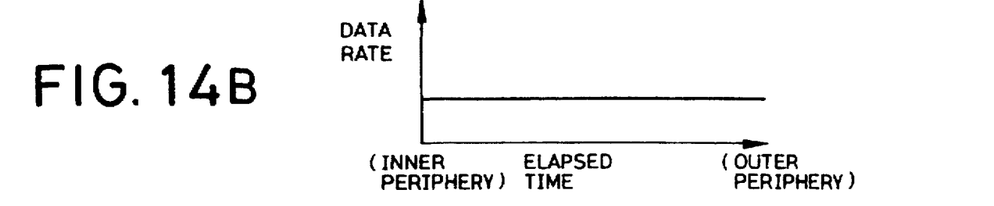
Figure 14C:
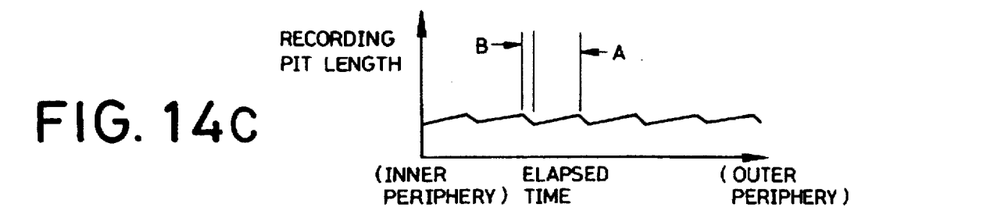
Figure 14D:
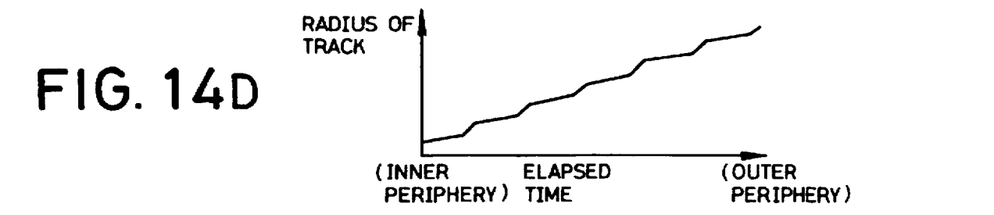
Figure 14E:
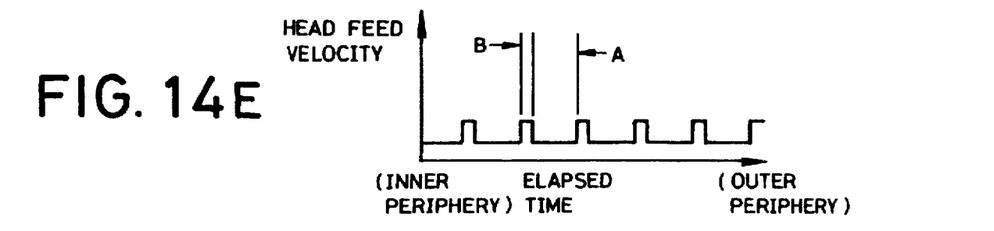

FIGS. 14A–14B are graphs showing of the recording operation of the MCLV system. The operation of the mother disc recording apparatus shown in FIG. 13 will now be described with reference to FIG. 14. In order to reduce the optical disc rotational speed in the boundary area and to enlarge a track pitch, in case of the MCLV system, it is necessary to synchronously change the feed velocity of the optical head feed driving system and the rotational speed of the turntable.

In case of changing the feed velocity on the basis of the rotational speed in the boundary area, in the mother disc recording apparatus shown in FIG. 13, the servo control circuit 120 switches a signal frequency which is supplied to the feed servo 105 on the basis of information on spindle rotation, recording radius and linear velocity, thereby changing the feed velocity.

A portion 14A in FIG. 14 shows a change in rotational speed of the optical disc mother disc 60 over a time (t) in the case where information is recorded from the inner periphery toward the outer periphery of the optical disc mother disc 60. A so called CAA (Constant Angular Acceleration) operation is executed such that the rotational speed is maintained constant in a section A and a decreasing ratio of the rotational angular velocity is maintained constant in a section B. As shown in a portion 14B in FIG. 14, the data rate is maintained constant at all circumferences. As shown in a portion 14C in FIG. 14, therefore, the recording pit length (linear velocity) lies within an almost predetermined range. The rotational angular velocity (ω) is controlled so as to decrease step by step as a distance r in the radial direction of the optical disc mother disc increases. On the other hand, as shown in a portion 14D in FIG. 14, the radial distance r (radial position) attains two rates of increase the head feed velocity is periodically raised to a high velocity at predetermined intervals by the actuator 104, as depicted in portion 14E of FIG. 14.

At the point in time when the linear velocity v reaches a predetermined maximum value v(1+α), the servo control circuit 120 increases the frequency dividing ratio n of the frequency dividing circuit, thereby controlling the ratio to n+Δn (α is a positive value). In association with this, an output frequency of the frequency dividing circuit of the servo control circuit is decreased and the spindle servo circuit 63 is released from a locking state and operates so as to decrease the rotational angular velocity in accordance with predetermined characteristics.

At the same time, the servo control circuit 120 sets the frequency of the output to the feed servo circuit at a high frequency so as to raise the head feed velocity in order to increase the track pitch in synchronism with the detection result of the linear velocity of the predetermined rotational speed v(1+α).

The above period of time is shown as the section B in the diagram. In this period of time, for example, the CAA operation is executed such that the decreasing ratio of the rotational angular velocity (ω) is made constant.

As a result, in the recording area on the optical disc mother disc in the section A, the sync signal recording portions on the adjacent recording tracks are located on the same straight line in the radial direction. An information signal is recorded so that the distance between the adjacent sync signal recording portions in the circumference direction does not exceed the distance that is determined by the value of v(1+α). In the recording area on the optical disc mother disc in the section B, an information signal is recorded so that the distance between the sync signal recording portions converges to the distance that is determined by the value of v(1−α) while sequentially changing from the distance that is determined by the value of v(1+α).

The operation of the mother disc recording apparatus in the section B will now be described in detail with reference to FIGS. 15 and 16.

Figure 15A:
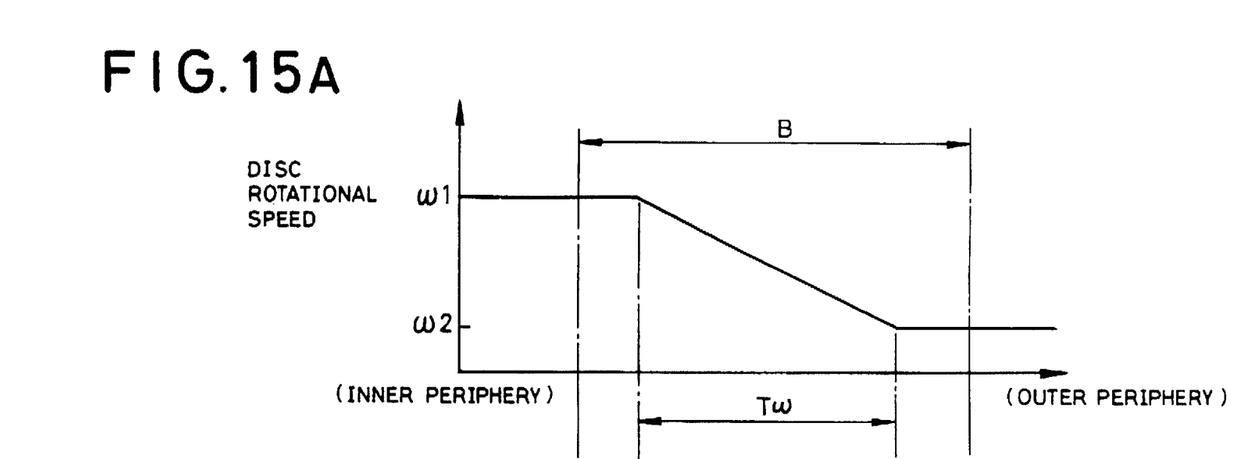
FIGS. 15A–15B are diagrams indicating changes in disc rotational speed and head feed velocity in a section B of the graph shown in FIG. 14 in detail.
Figure 15B:
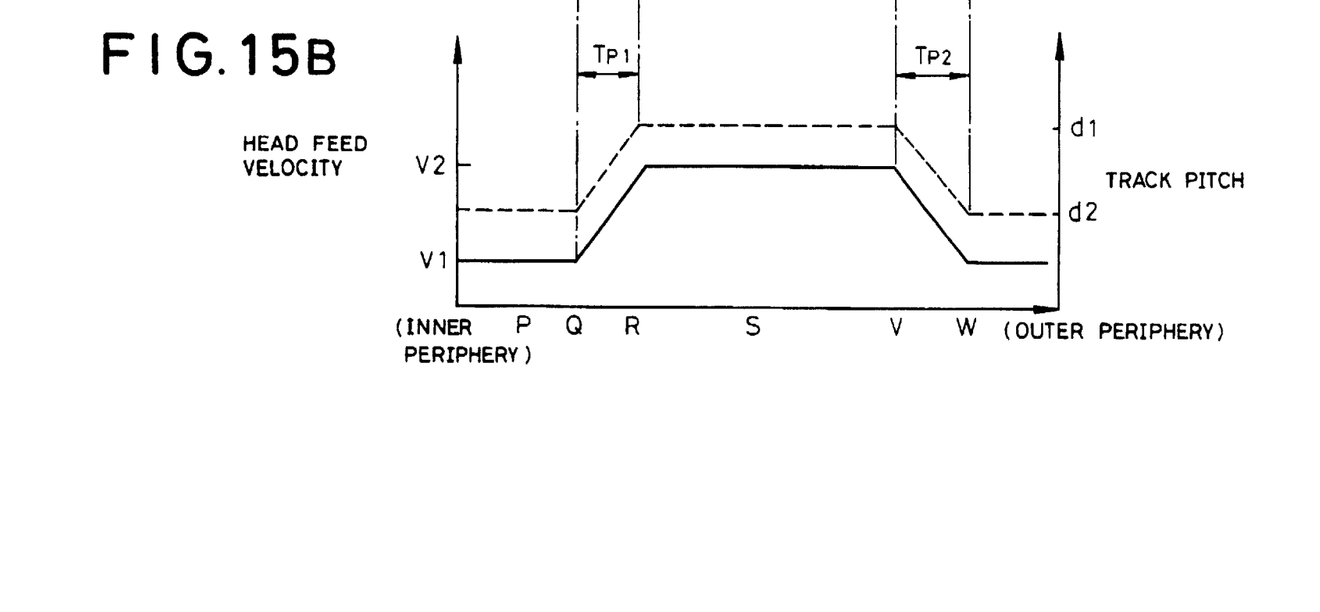

Portions 15A and 15B in FIG. 15 show graphs indicating the details of the changing operations of the disc rotational speed and the head feed velocity in the section B shown in the portions 15A and 15E in FIG. 14, respectively. FIG. 16 is a diagram showing an example of the formation of the boundary area 33 of the optical disc formed by the operation of such a mother disc recording apparatus. In FIG. 16, each servo area is spirally recorded counterclockwise from the inner periphery side of the disc.

Figure 16:
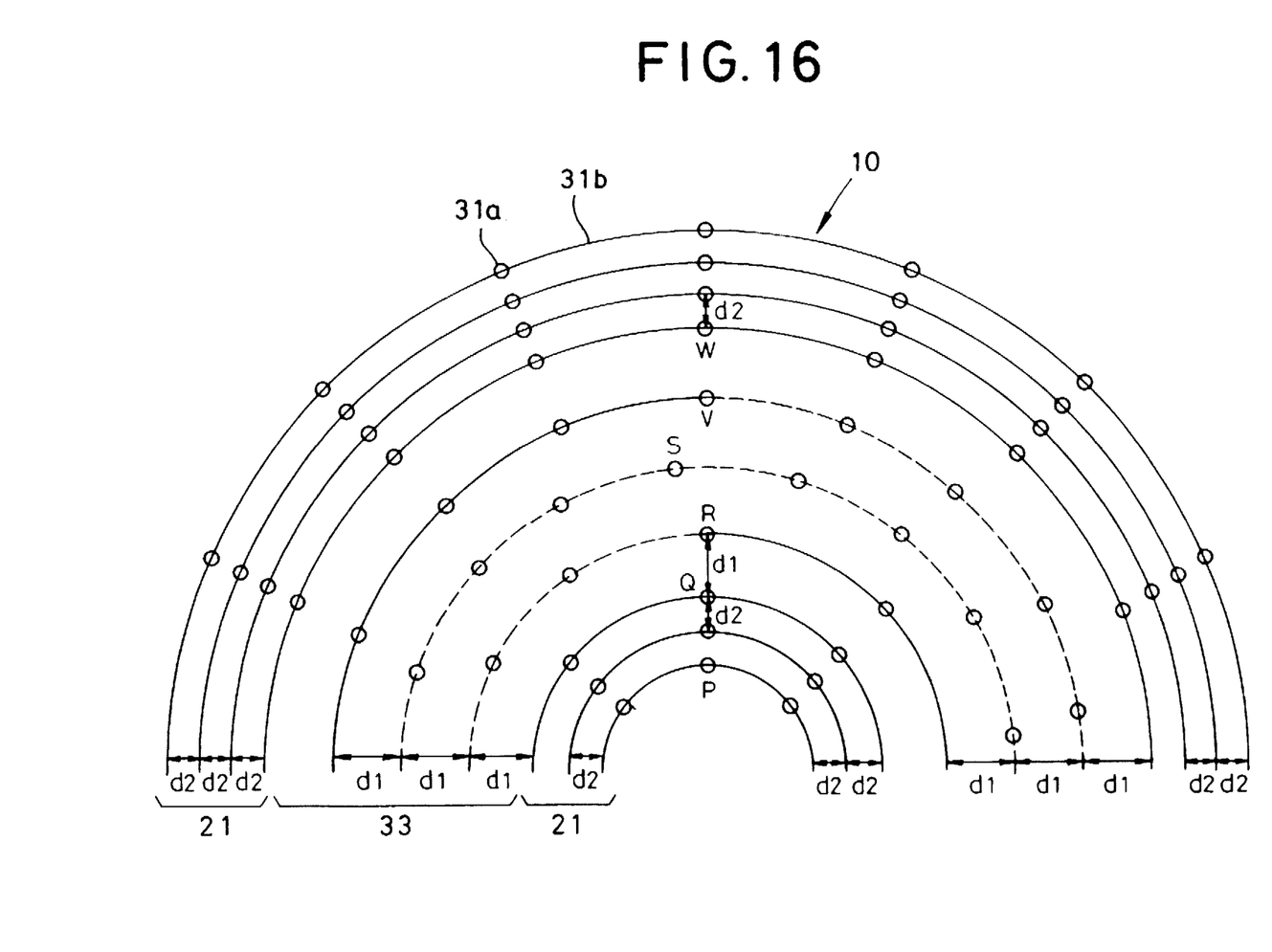
FIG. 16 is a diagram showing an example of formation of a boundary area 33 of the optical disc which is formed by the operation of the mother disc recording apparatus.
Figure 17A:
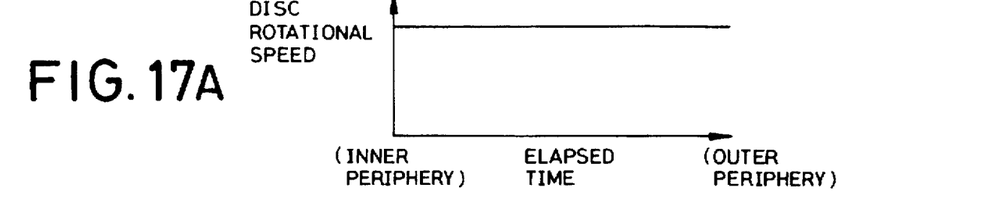
FIGS. 17A–17E show graphs indicating changes in disc rotational speed, data rate, recording pit length, track radius, and head feed velocity for the recording elapsed time of the optical disc of another embodiment.
Figure 17B:
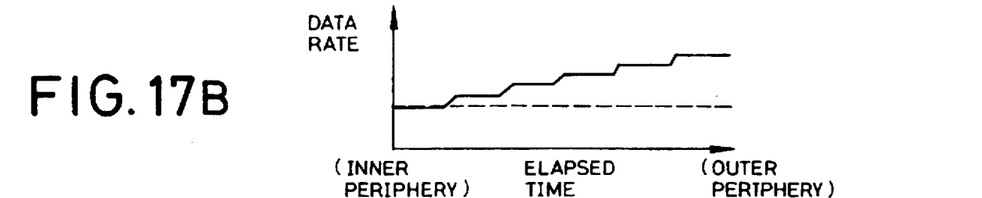
Figure 17C:
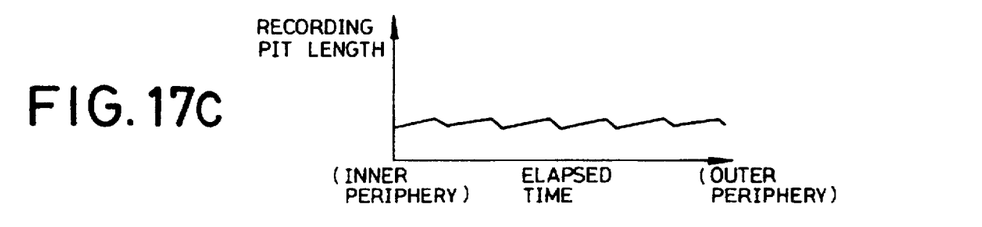
Figure 17D:
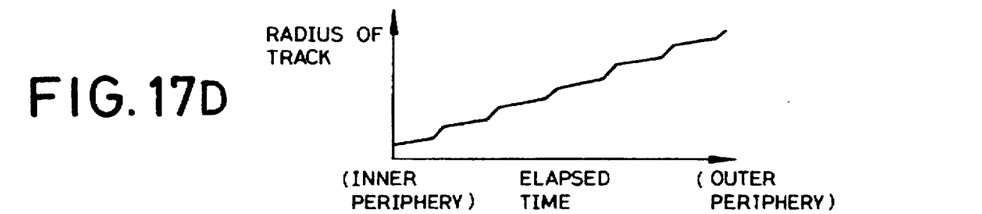
Figure 17E:
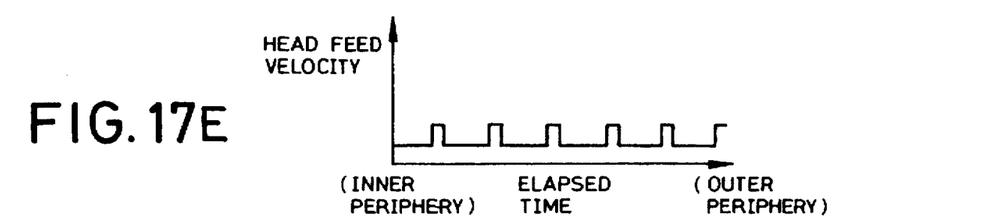

First, as shown by a solid line in the portion 15A in FIG. 15, the disc rotational speed is equal to a predetermined rotational speed ω1 in a range between the recording points P and Q of the servo area 31a in the zone 21 on the inner periphery side in FIG. 16. The head feed velocity is also fixed to a predetermined velocity v1 as shown by a solid line in the portion 15B in FIG. 15. In this instance, the track pitch between the recording points P and Q is maintained at a constant track pitch d2 as shown by a broken line in the portion 15B in FIG. 15.

In the interval between the recording points Q and R in FIG. 16, the head feed velocity is raised to v2 as shown by the solid line in the portion 15B in FIG. 15. In this instance, the disc rotational speed is maintained at the fixed value of ω1 up to the recording point R as shown in the portion 15A in FIG. 15. In the section between the recording points Q and R, the track pitch is gradually widened from d2 and reaches d1 at the recording point R, by raising the head feed velocity from v1 to v2 as shown by the broken line in the portion 15B in FIG. 15. The above-mentioned section between the recording points Q and R forms a track pitch enlarging change section $T_{p1}$.

Subsequently, the disc rotational speed is gradually decreased in the sections including the recording points R, S, and V as shown in the portion 15A in FIG. 15. The sections including recording points R, S, and V mentioned above form a disc rotational speed changing section Tω. The boundary area 33 comprising the tracks shown by broken lines in FIG. 16 is formed in the disc rotational speed changing section Tω.

In a section between the recording points V and W in FIG. 16, the head feed velocity is decreased to v1 as shown by the solid line in the portion 15B in FIG. 15 and the reduction of the value of the disc rotational speed is stopped and is fixed to ω2 as shown in the portion 15A in FIG. 15. In the section between the recording points V and W, the head feed velocity is returned from v2 to v1 and, further, the disc rotational speed is fixed to ω2, so that the track pitch is gradually narrowed from d1 and is returned to d2 at the recording point W as shown by the broken line in the portion 15B in FIG. 15. The above-mentioned section between the recording points V and W forms a track pitch reducing change section $TP_{p2}$. After the recording point W, the zone 21 comprising the tracks as shown by the solid lines in FIG. 16 is again formed.

The section B mentioned above is constituted by the track pitch enlarging change section $T_{p1}$, disc rotational speed changing section Tω, and track pitch reducing change section $T_{p2}$.

As a CAA operation as mentioned above, it is also sufficient that the servo control circuit 120 supplies a driving signal to the spindle servo circuit 63, which provides a brake power to the spindle motor 62, thereby reducing the speed of the spindle motor 62. It is also sufficient to decelerate the speed to a constant speed by the free-running operation at the time of opening state of the spindle servo system.

As a detection result of the linear velocity in the servo control circuit, when the rotational speed is decreased to a predetermined value of v(1−α), the operation is again switched to the CAV operation. Since the servo and sync signal recording portions are aligned and arranged on the same straight line in the radial direction in the neighboring tracks for the CAV operation period which correspond to the section A, the radial position of the optical disc mother disc for switching to the CAV operation is limited to a predetermined position. Therefore, the switching operation is controlled in accordance with an output of the laser length measuring device 201.

At the same time, the servo control circuit 120 sets the frequency of an output to the feed servo circuit at a low frequency in order to make the head feed velocity correspond to a decreasing track pitch synchronously with the detection result of the linear velocity of the predetermined rotational speed of v(1−α).

The value of the radial position r is stored into the servo control circuit 120 or the value is obtained by arithmetic operation. When the linear velocity v approaches v(1−α) and the radius r satisfies a predetermined equation, the operation is switched to the CAV operation. Therefore, a control signal for setting the frequency dividing ratio n to a value $n_r$ corresponding to the predetermined radial position r is generated from the servo control circuit 120 at that time point. By this control system, the spindle servo system operates so as to lock the frequency dividing output of the frequency dividing circuit and rotates the optical disc mother disc at a constant rotational angular speed.

The servo control circuit 120 comprises a microprocessor having a memory. The recording linear velocity v is monitored by the servo control circuit. The servo control circuit doesn't operate until the linear velocity v reaches the upper limit value v(1+α). When the linear velocity v reaches the upper limit value, the frequency dividing ratio n of the frequency dividing circuit is increased by only Δn. Since the output of the frequency dividing circuit, serving as a reference signal of the spindle servo circuit 63, is changed in association with this, a spindle servo loop is released from the locking state and the rotational speed of the spindle motor 62 decreases in accordance with the characteristics determined by the servo control circuit 120. The decrease in rotational speed of the spindle motor 62 is detected as a decrease in linear velocity v.

When the linear velocity v is at a value near a predetermined range v(1−α), the servo control circuit 120 calculates the value r which has been stored in the memory and is located nearest to the present radial position. When the radius r reaches the predetermined value, the frequency dividing ratio n is reset to a predetermined value $n_r$ so that sync signals between the neighboring tracks near the radius r are aligned on the same straight line in the radial direction.

In the optical disc mother disc recorded as mentioned above, since a fairly large portion of the recording time can be recorded by the CAV system, the recording positions of the sync signals between the adjacent tracks are aligned on the same straight line in the radial direction. Since the track pitch is enlarged during the CAA operation, there is no crosstalk. Further, since the rotational angular velocity in each section recorded according to the CAV system can be decreased step by step, as compared with the conventional case wherein recording is performed consistently by the CAV system, the recording density can be substantially increased.

As mentioned above, since the optical head feed driving system comprises a narrow band control system using a feed screw and a wide band control system using a biaxial actuator, it is sufficient to drive the biaxial actuator in such a direction as to widen the track pitch in the boundary area. The number of tracks whose track pitches are widened in the boundary area occupies a fairly small ratio as compared with the number of tracks extending from the innermost to outermost circumference of the optical disc mother disc, so that the reduction in overall capacity due to the decrease in track density in the boundary area is fairly small.

FIGS. 17A–17E are graphs showing a change in each parameter over a time (t) in the case where information is recorded from the inner periphery toward the outer periphery of the optical disc mother disc 60 by the operation of the MCAV system. In the MCAV system, as shown in a portion 17A in FIG. 17, the optical disc rotational speed is maintained constant, the data rate of the zone is raised toward the outer periphery step by step so as to be higher than the CAV system, as depicted in portion 17B of FIG. 17, so that the recording pit length in each zone can be shorter than that of the CAV system while being maintained within an almost constant range, as depicted in portion 17C in FIG. 17. As the clock frequency rises in the boundary area B, the track pitch is enlarged, as depicted in portion 17O of FIG. 17. Such a process can be accomplished by periodically raising the head feed velocity at predetermined intervals, as depicted in portion 17D of FIG. 17.

According to the invention, the high density of both the MCAV or MCLV system and the high density by the narrow track system can be realized by enlarging the track pitch in the boundary area.

What is claimed is:

1. An optical disc in which a circular recording area comprising either a plurality of concentric tracks or a spiral recording track carrying information signals including sync signals is divided into a plurality of zones by circular boundary areas, wherein:

each said recording track is constituted by a plurality of sectors each comprising a servo area and a data area, said servo areas are located on straight lines in radial directions in each of said zones, and a radial track pitch of said boundary area is larger than a radial track pitch within said zones.

2. An optical disc comprising:

a circular recording area, wherein a plurality of concentric tracks are provided for carrying information signals including sync signals, said recording area comprising at least two annular zones and at least one annular boundary area interposed between the annular zones, wherein said recording tracks each have a plurality of sectors, each of said sectors comprising a servo area and a data area, said servo areas being aligned radially within each of the annular zones, and wherein a radial track pitch within the boundary area is larger than a track pitch within said zones.

3. An optical disc according to claim 2, wherein said recording area comprises more than two annular zones and more than one annular boundary area, the annular boundary areas respectively alternating with respective ones of the annular zones in said recording area.

4. An optical disc according to claim 2, wherein said said servo areas of one of the annular zones fail to be aligned radially with said servo areas of another one of the annular zones.

5. An optical disc comprising:

a circular recording area, wherein a spiral recording track is provided for carrying information signals including sync signals, said recording area comprising at least two annular zones and at least one annular boundary area interposed between the annular zones, wherein said recording track has a plurality of sectors, each of said sectors comprising a servo area and a data area, said servo areas being aligned radially within each of the annualar zones, and wherein a radial track pitch within the boundary area is larger than a track pitch within said zones.

6. An optical disc according to claim 5, wherein said recording area comprises more than two annular zones and more than one annular boundary area, the annular boundary areas respectively alternating with respective ones of the annular zones in said recording area.

7. An optical disc according to claim 6, wherein said said servo areas of one of the annular zones fail to be aligned radially with said servo areas of another one of the annular zones.

* * * * *